(12) United States Patent
Leeb

(10) Patent No.: US 6,213,691 B1
(45) Date of Patent: Apr. 10, 2001

(54) CIRCULAR DRILL CUTTER WITH INDEXABLE INSERTS AND PERTAINING TIP SEATS

(76) Inventor: Felix Leeb, Zum Espat 3, D-94405 Landau (DE)

( * ) Notice: Subject to any disclaimer, the term of this patent is extended or adjusted under 35 U.S.C. 154(b) by 0 days.

(21) Appl. No.: 09/194,655

(22) PCT Filed: Mar. 3, 1998

(86) PCT No.: PCT/DE98/00640

§ 371 Date: Dec. 6, 1999

§ 102(e) Date: Dec. 6, 1999

(87) PCT Pub. No.: WO98/40183

PCT Pub. Date: Sep. 17, 1998

(30) Foreign Application Priority Data

Mar. 7, 1997 (DE) .............................................. 197 09 436

(51) Int. Cl.$^7$ ........................................................ B23C 5/20

(52) U.S. Cl. ................................ 407/34; 407/35; 407/113; 407/114

(58) Field of Search ................................ 407/34, 35, 113, 407/114, 115, 116, 62, 63, 64, 65, 40, 42, 54

(56) References Cited

U.S. PATENT DOCUMENTS

| 4,084,917 | * | 4/1978 | Stumpp ................................ 407/114 |
| 4,934,878 | * | 6/1990 | Plutschuck et al. ............. 407/114 X |
| 5,913,644 | * | 6/1999 | DeRoche et al. ................. 407/63 X |
| 5,947,649 | * | 9/1999 | Arail et al. ......................... 407/35 X |
| 6,050,752 | * | 4/2000 | DeRoche ............................. 407/35 X |

* cited by examiner

Primary Examiner—Henry Tsai
(74) Attorney, Agent, or Firm—Brown & Wood, LLP

(57) ABSTRACT

A milling tool fitted with indexable bits to be used as a circular drill cutter for forming pockets, elongate recesses and through-bores in a solid material and for milling already existing recesses, with a possibility of relief milling or counterboring of through-bores from beneath.

4 Claims, 5 Drawing Sheets

CIRCULAR DRILL CUTTER WITH INDEXABLE INSERTS AND PERTAINING TIP SEATS

BACKGROUND OF THE INVENTION

1. Field of the Invention

The present invention relates to a circular drill cutter with indexable bits and associated bit seats for producing pockets, elongate slotted holes, through-bores in a solid material, with a possibility of relief milling and rearward counterboring, reaming of already produced openings, wherein the tool is rotatably driven on CNC-controlled machine-tool and is displaced along a path with a continuous feeding along a Z-axis or, during formation of large pockets and during copy milling, is driven without feeding along the Z-axis, wherein the indexable bit has, for each cutting engagement region, a main face cutting edge and a face side cutting edge, a finishing cutting region, and a cross-cutting edge which forms a transitional region between finishing cutting region and the adjacent cutting engagement region, and a cross-cutting edge which forms a transitional region between the main face cutting region and the next cutting engagement region, and wherein the indexable bit has a chip forming groove.

2. Description of the Related Art

German Publication DE 4 342 577 A1 discloses a drill cutter for producing openings, fits in a solid material, cut-out, and threads in association with CNC-controlled machine-tools. In DE 4 342 577 A1, the outer flank cutting edges are divided in a roughing cutting region and a finishing cutting region. In German Patent DE 39 09 77, two front cutting edges per a cutting unit are used for forming cored openings. In order to provide two end sides for each indexable bit, in DE 39 09 077, respectively, two triangularly shaped indexing bits are used. The drawback of this consists in that the necessity to provide, respectively, two indexable bits for each cutting unit, permits mounting on the tool shank only a limited number (a half) of cutting units. The necessity to provide two bits for each cutting unit double the price of a cutting unit and, secondly, the fitting of the milling cutter within the limited number of the cutting units increases the production time by 100%. Further, a method of producing fits is disclosed in DE 43 42 577 A1 in which the finishing size is produced during the return stroke. However, this cutting geometry and this method do not permit to produce fits in a solid material without changing the tool.

Despite these improvements, in many cases, an economical use is not possible. For one, when cutters are formed as indexable bits, they can be turned only once, secondly, in many cases such as the production of pockets during copy milling and milling off burned spots and cored recesses, the second inwardly located face cutting edge is not necessary.

Also, during the production of the through-bores, the inwardly located face cutting edge must not necessarily lie at the same height. Still further, a non-slip mounting of the indexable bits on the bit holder in accordance with the solution set forth in DE 43 42 527 A1 (recesses and tubes) is not insured during heavy machining. Yet further, the space provided for the necessary key elements (torque screwdriver) for changing the bits limits the number of indexable bits to be secured on the tool head with screw clamps. In addition, the possibility of chambering and relief milling need be insured.

Therefore, an object of the present invention is an economically operating circular drill cutter with indexable bits capable of being turned more than once, with an improved roughing cutting region, with an integrated finishing cutting region, and with a cutting edge for rearward chambering of through-openings with which relief milling of recesses is also possible, and with drill cutter having a slip-free bit seat, and wherein a largest possible number of indexable bits with different face cutting edges can be secured on the circular drill cutter.

SUMMARY OF THE INVENTION

The object of the invention is achieved by providing a circular drill cutter of the type described above in which the indexable bit has three identical cutting engagement regions offset relative to each other by 120°, with the main face cutting edge having a short straight main face cutting edge and a connection cutting edge formed with a radius and extending to a finishing cutting edge, with a cross-cutting edge between the finishing cutting edge and the adjacent cutting region being formed as a countersunk cutting edge, has an offset circumferential surface spaced from the bit circumference a different distance and which is so formed that there are provided three contact surfaces with two respective contact surfaces of adjacent cutting regions being aligned with each other along a line, and in which the bit seat is so formed that it has three contact surfaces, which correspond to contact surfaces of the indexable bit and project from a milled surface of the bit seat, with the bit seat being displaced by a negative radial angle and pivoted by a negative axial angle.

According to a further embodiment of the inventive cutter, the main fall cutting edge can have a short straight main face cutting edge and a straight cross-cutting edge forming a connection cutting edge to the finishing cutting edge.

According to a still further embodiment of the inventive cutter the main face cutting edge includes a short straight main face cutting edge and a connection cutting edge formed by a broken line The invention will now be described in detail below with reference to the drawings which show a practical embodiment of the invention.

DETAILED DESCRIPTION OF THE PREFERRED EMBODIMENTS

Figure 1:
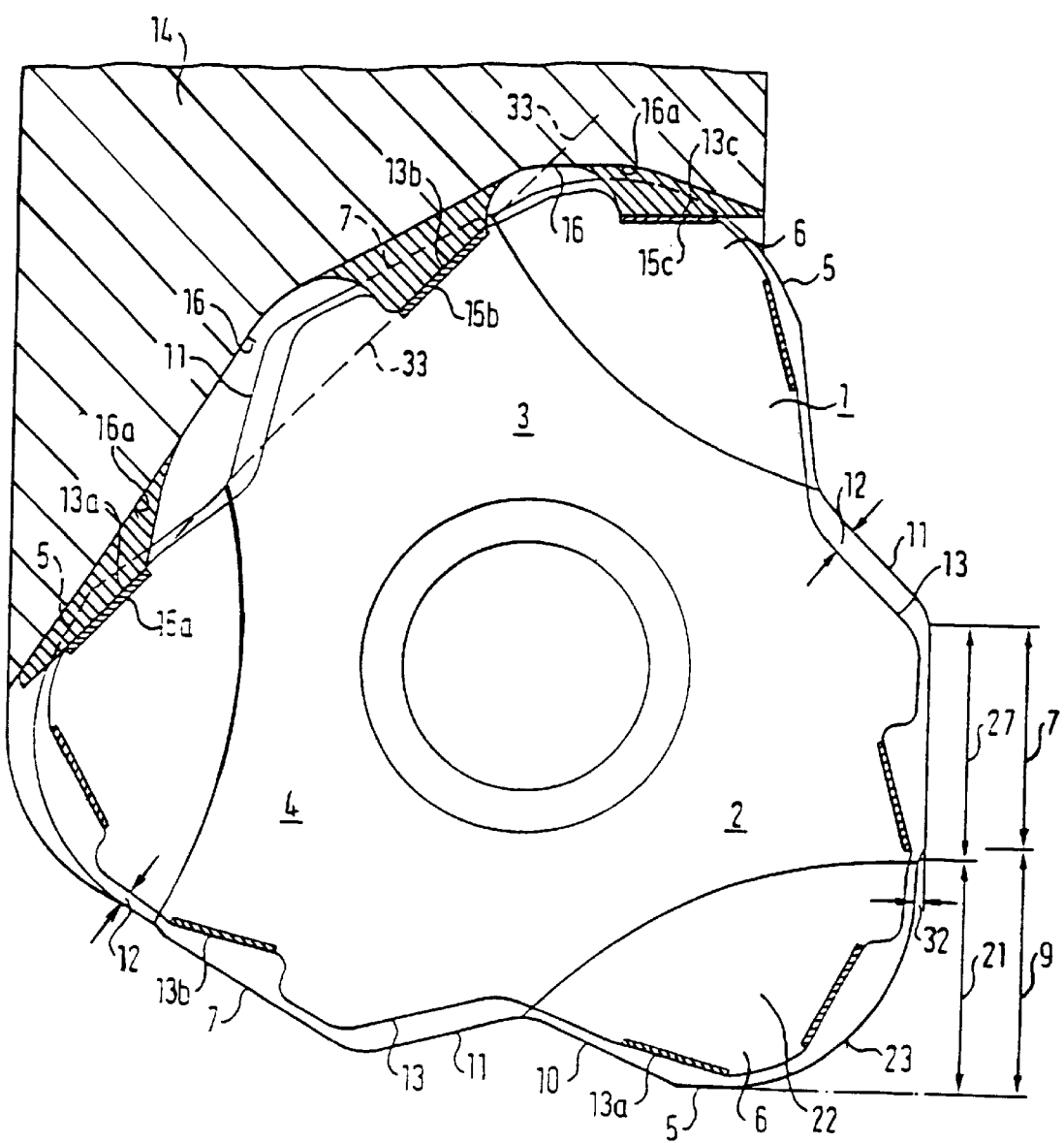
FIG. 1 shows an indexable bit with a built-in offset contact surface and a portion of a tool bit holder.
Figure 2:
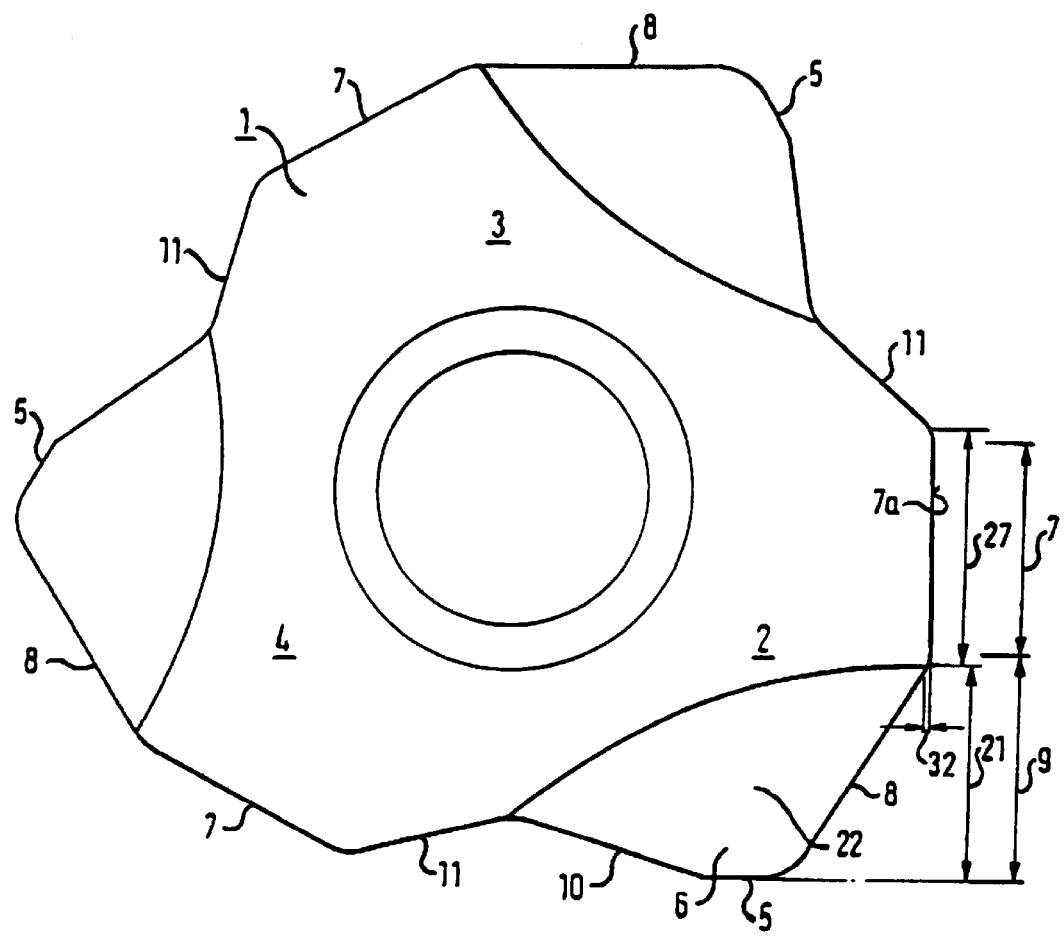
FIG. 2 shows a plan view of the indexable bit.

A bit seat 25, which is shown in FIG. 1, is fitted with an indexable bit 1 having three rotationally symmetrical cutting units 2, 3, 4. At that, a respective roughing cutting region 9 is formed by a main face cutting edge 6 which is divided into a short, straight front cutting edge 5 and a connection cutting edge formed with a radius 23 and connected to the finishing cutting region 27. The connection cutting edge can be formed by a straight cross-cutting edge 8 or by a broken line 24, 24a which can rise at an angle of about 30° and extend further at an angle of about 4° (the line 24a). The finishing cutting region 27 is formed by a straight finishing cutting edge 7 extending in a direction of a tool axis 26 and adjoined by a cross-cutting edge 11 which extends toward the next cutting unit 3 at angle of about 45°. In the inwardly located region, a further cross-cutting edge 10, which is formed as a straight line or a curve and which forms a connection to an adjacent cutting unit 4, adjoins the main face cutting edge 5. All transitional regions are formed with radii. The bit seat, which is shown in FIG. 1, is so formed that an offset surface 13 of the indexable bit 1 is spaced from an outer circumference at a different distance 12. The surface 13 is so formed that there are provided three contact surfaces 13a, 13b, 13c for each cutting region, with respective two contact surfaces 13a, 13b of adjacent cutting regions being aligned along a line 33, and the bit seat 25 is so formed that it has three contact surfaces 15a, 15b, 15c which correspond to the contact surfaces of the indexable bit and which project from a milled surface 16. Thus, the indexing bit has a three-point support.

Figure 3:
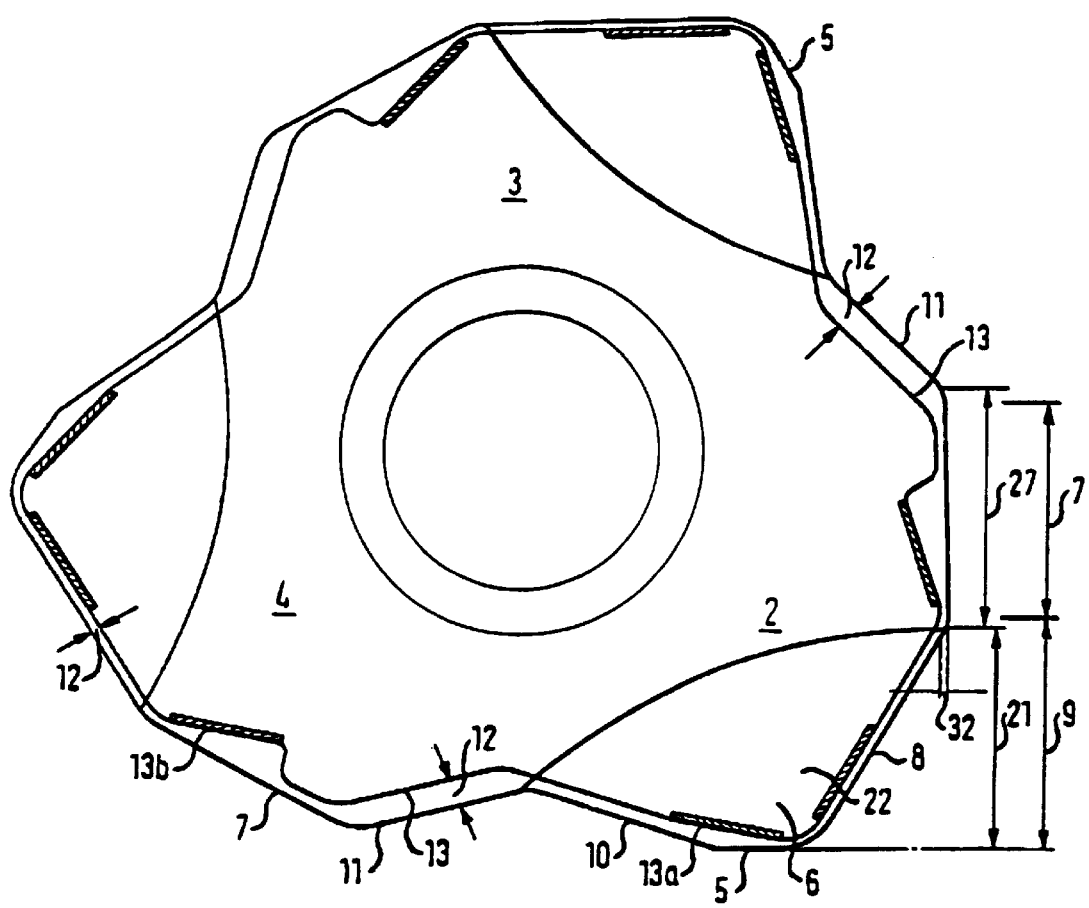
FIG. 3 shows an indexable bit with a cutting edge transition in a form of a cross-cutting edge.

FIG. 3 shows an indexing bit 1 the connection cutting edge of which is formed as a cross-cutting edge (8).

Figure 4:
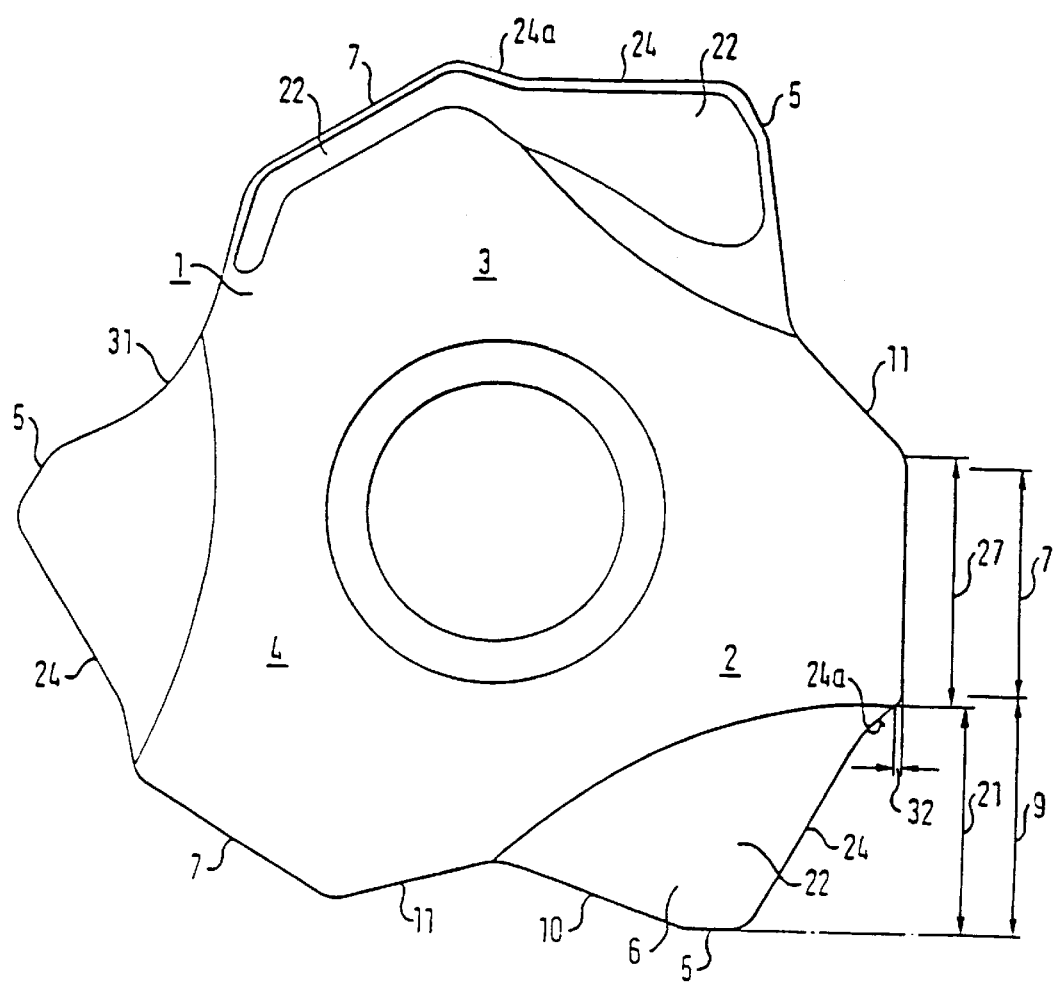
FIG. 4 shows an indexable bit with a broken connection cutting edge.

FIG. 4 shows an indexing bit 1 with a broken connection edge 24, 24a.

In order to be able to attach a most possible number of indexing bits 1 to an indexing bit holder, the bit seat 25 has a negative axial angle 26a and a negative radial angle 17. Thereby, the clearance angle of the indexable bit 1 can be 0° in the partial region (1a), and in the mounted condition, the clearance angle can reach about 7–12°. The advantage of the displacement of the bit seat 25 both radially and axially consists in that the indexing bit 1 is reinforced in its roughing region and, in addition, the indexing bit holder (14) is reinforced in its bottom region. Thus, in FIG. 6, the roughing cutting region 21 of the indexing bit 1 has a projecting surface 8a extending, in a mounted condition, at an angle of about 18°. The finishing cutting edge 7 and the finishing cutting region 27 extend parallel to the tool axis 26. Thereby, it is achieved that the finishing cutting edge 7 projects beyond the roughing cutting edge 8, 23, 24a by about 0.05 mm at 32. Because only the main cutting edge 6, the finishing cutting edge 7, and the cross-cutting edge 11, of the indexable bit 1 are in a cutting engagement, the inwardly located cutting region 6a has no any cutting engagement.

Figure 5:
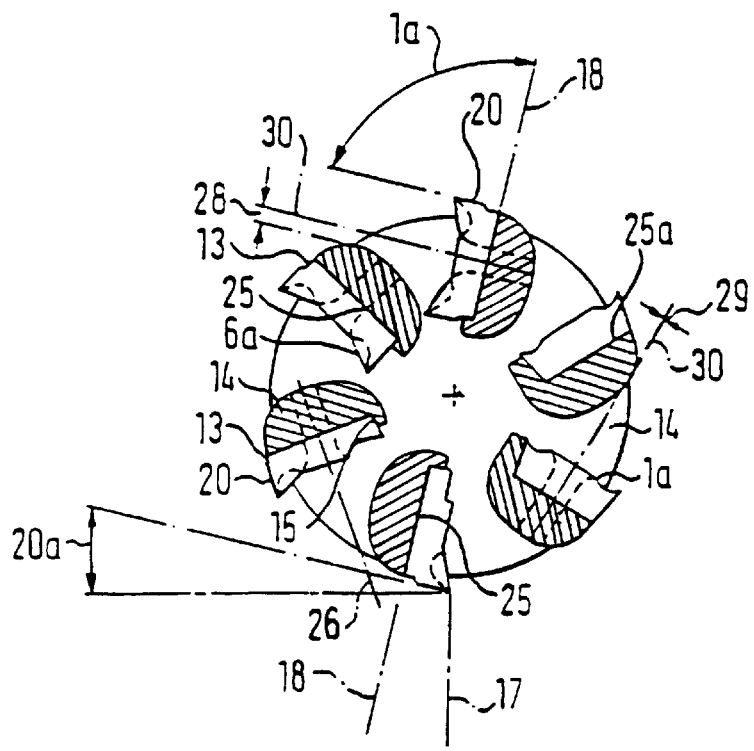
FIG. 5 shows an end view of an indexable bit holder with mounted bits.
Figure 6:
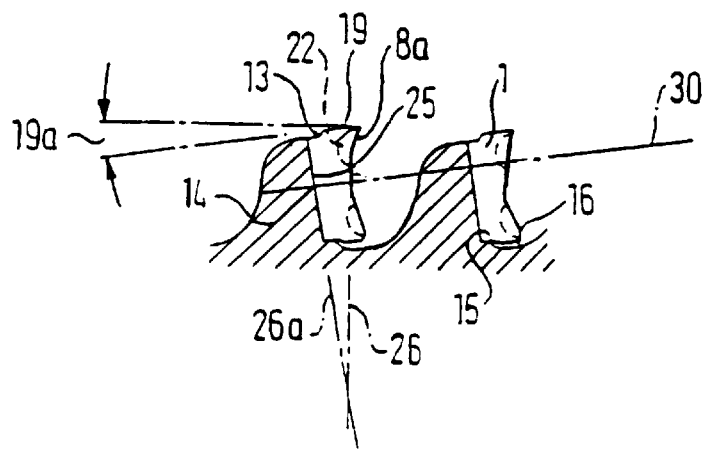
FIG. 6 show a partial view of an indexable bit with a turned bit seat.
Figure 7:
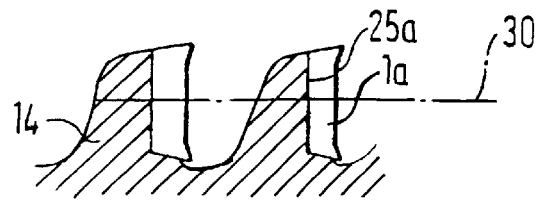
FIG. 7 shows a partial view of an indexable bit with a conventional bit seat.

Negative axial and negative radial displacement also provide for increase of the clearance space 28 for a control key, as shown in FIGS. 5 and 6. Thus, FIG. 5 shows that the clearance space 29 of a non-radially displaced bit seat is smaller than the clearance space 28 of a radially displaced bit seat 25.

What is claimed is:

1. A circular drill cutter for producing pockets, elongate slotted holes, through-bores in a solid material with a possibility of relief milling and rearward counterbohring, reaming of already produced openings, wherein the cutter is rotatably driven on CNC-controlled machine-tool and is displaced along a path with a continuous feeding along a Z-axis or, during formation of large pockets and during copy milling, is driven without being fed along the Z-axis, the circular drill cutter comprising a plurality of indexable bits; and a plurality of bit seats for supporting the bits, wherein each indexable bit (1) has three identical cutting engagement regions (2,3,4) offset relative to each other by 120°, each cutting engagement region including a main face cutting edge having a short straight main face cutting edge (5), a finishing cutting edge (7), and a circular connection cutting edge (23) extending between the main face cutting edge (6) and the finishing cutting edge (7), wherein the indexable bit (1) has a plurality of cross-cutting edges (11) extending, respectively, between the finishing cutting edges of respective cutting engagement regions and adjacent cutting engagement regions and formed as countersunk cutting edges, wherein the indexable bit (1) has an offset circumferential surface (13) spaced a different distance from a bit circumference and including three contact surfaces (15a, 15b, 15c) associated with the three cutting engagement regions (2, 3, 4), respectively, two respective contact surfaces (15a, 15b) of two adjacent cutting regions (3, 4) being aligned with each other along a straight line (33), and wherein a bit seat (225) has three contact surfaces (13a, 13b, 13c) corresponding to the three contact surfaces (15a, 15b, 15c) of the indexable bit (1) and projecting from a milled surface (16) of the bit seat (25), the bit seat (25), the bit seat (25) being displaced by a negative radial angle (17) and pivoted by a negative axial angle (26a).

2. A circular drill cutter for producing pockets, elongate slotted holes, through-bores in a solid material with a possibility of relief milling and rearward counterbohring, reaming of already produced openings, wherein the cutter is rotatably driven on CNC-controlled machine-tool and is displaced along a path with a continuous feeding along a Z-axis or, during formation of large pockets and during copy milling, is driven without being fed along the Z-axis, the circular drill cutter comprising a plurality of indexable bits; and a plurality of bit seats for supporting the bits, wherein each indexable bit (1) has three identical cutting engagement regions (2, 3, 4) offset relative to each other by 120°, each cutting engagement region including a main face cutting edge having a short straight main face cutting edge (5), a finishing cutting edge (7), a straight cross-cutting connection edge (8) extending between the main face cutting edge (6) and the finishing cutting edge (7), wherein the indexable bit (1) has a plurality of cross-cutting edges (11) extending, respectively, between the finishing cutting edges of respective cutting engagement regions and adjacent cutting engagement regions and formed as countersunk cutting edges, wherein the indexable bit (1) has an offset circumferential surface (13) spaced a different distance from a bit circumference and including three contact surfaces (15a, 15b, 15c) associated with the three cutting engagement regions (2, 3, 4), respectively, two respective contact surfaces (15a, 15b) of two adjacent cutting regions (3, 4) being aligned with each other along a straight line (33), and wherein a bit seat (25) has three contact surfaces (13a, 13b, 13c) corresponding to the three contact surfaces (15a, 15b, 15c) of the indexable bit (1) and projecting from a milled surface (16) of the bit seat (25), the bit seat (25), the bit seat (25) being displaced by a negative radial angle (17) and pivoted by a negative axial angle (26a).

3. A circular drill cutter for producing pockets, elongate slotted holes, through-bores in a solid material with a possibility of relief milling and rearward counterbohring, reaming of already produced openings, wherein the cutter is rotatably driven on CNC-controlled machine-tool and is displaced along a path with a continuous feeding along a Z-axis or, during formation of large pockets and during copy milling, is driven without being fed along the Z-axis, the circular drill cutter comprising a plurality of indexable bits; and a plurality of bit seats for supporting the bits, wherein each indexable bit (1) has three identical cutting engagement regions (2,3,4) offset relative to each other by 120°, each cutting engagement region including a main face cutting edge having a short straight main face cutting edge (5), a finishing cutting edge (7), a connection cutting edge formed by a broken line (24, 24a) and extending between the main face cutting edge (6) and the finishing cutting edge (7), wherein the indexable bit (1) has a plurality of cross-cutting edges (11) extending, respectively, between the finishing cutting edges of respective cutting engagement regions and adjacent cutting engagement regions and formed as countersunk cutting edges, wherein the indexable bit (1) has an offset circumferential surface (13) spaced a different distance from a bit circumference and including three contact surfaces (15a, 15b, 15c) associated with the three cutting engagement regions (2, 3, 4), respectively, two respective contact surfaces (15a, 15b) of two adjacent cutting regions (3, 4) being aligned with each other along a straight line (33), and wherein a bit seat (25) has three contact surfaces (13a, 13b, 13c) corresponding to the three contact surfaces (15a, 15b, 15c) of the indexable bit (1) and projecting from a milled surface (16) of the bit seat (25), the bit seat (25), the bit seat (25) being displaced by a negative radial angle (17) and pivoted by a negative axial angle (26a).

4. A circular drill cutter according to any of claims 1–3, wherein the indexable bit (1) has a front clearance angle (19a) which, in a mounted condition, amounts to 7°–9°, and a clearance angle (20a) of 9°–11° in the circumferential cutting region.

* * * * *